United States Patent [19]

Beneck et al.

[11] Patent Number: 5,001,949
[45] Date of Patent: Mar. 26, 1991

[54] APPARATUS AND METHOD FOR REMOVING NUCLEAR FUEL ASSEMBLY END PIECES

[75] Inventors: Jean-Albert Beneck, Ormesson; Claude Quayre, Neuilly-Plaisance; Jean Moreau, Bourg de Peage; Daniel Vermeille, Romans, all of France

[73] Assignee: Framatome, Courbevoie, France

[21] Appl. No.: 284,519

[22] Filed: Dec. 15, 1988

[30] Foreign Application Priority Data

Dec. 15, 1987 [FR] France .............................. 87 17484

[51] Int. Cl.⁵ .............................................. B23B 3/04
[52] U.S. Cl. ....................................... 82/84; 376/436; 376/264; 252/627; 252/633
[58] Field of Search ................... 376/434, 436 V, 264, 376/268, 260, 272, 251, 261, 262; 252/626, 627, 633; 82/4 R, 84

[56] References Cited

U.S. PATENT DOCUMENTS 4,522,780  6/1985  Shallenberger ..................... 376/260
4,731,219  3/1988  Beneck .............................. 376/261

FOREIGN PATENT DOCUMENTS

0191359  1/1986  European Pat. Off. ............ 376/260
0321334  6/1989  European Pat. Off. ............ 376/260

*Primary Examiner*—Donald P. Walsh
*Attorney, Agent, or Firm*—Pollock, Vande Sande & Priddy

[57] ABSTRACT

An apparatus is used for cutting guide tubes of a nuclear fuel assembly below an end-piece and removing the end-piece. The apparatus includes a mount which may be removably locked and centered on the end-piece. Cutting tools insertable in the guide tubes each include a hollow shaft whose end part is split by longitudinal slits into radially expandable fingers each having a cutting edge. A stem movable axially along each shaft cooperates therewith for spreading the fingers out radially and retracting them. The shafts are mounted for rotation on a plate which is vertically movable with respect to the mount by a jack and carries a motor for simultaneously rotating all shafts. The shafts are carried by an expansion unit movable vertically with respect to the plate by a jack and including the stems. A method for separating the end-piece with the apparatus is also described.

8 Claims, 7 Drawing Sheets

APPARATUS AND METHOD FOR REMOVING NUCLEAR FUEL ASSEMBLY END PIECES

BACKGROUND OF THE INVENTION

Technical Field

The invention relates to an apparatus and method for separating an end-piece (frequently called an end nozzle), typically an upper end-piece, of a nuclear fuel assembly, the end-piece having an adapter plate formed with passages for receiving thin-walled guide tubes fixed to the adapter plate and to another end-piece of the fuel assembly to form a skeleton.

Present fuel assemblies for pressurized water nuclear reactors comprise such a skeleton, completed by grids for holding fuel rods parallel to each other and to the nodal points of a regular, typically square, lattice. The rods contain nuclear fuel pellets. In most assemblies, the rods do not extend throughout the whole length of the space defined by the end-pieces; in typical fuel assemblies they only project slightly above the uppermost grid.

The fuel assemblies, depleted after one or more cycles in the reactor, are removed from the reactor vessel and positioned in storage racks placed at the bottom of a de-activation swimming pool. To reduce the volume required for long duration storage of the fuel rods, it has already been proposed to dismantle the assemblies, to remove the rods therefrom and to consolidate the rods into bundles of tightly jointing rods. Dismantling an assembly involves removing an end-piece, consequently cutting the guide tubes and possibly the central instrumentation tube which connects the two end-pieces.

PRIOR ART

Apparatuses are already known for cutting the guide tubes successively or simultaneously. Examples are disclosed in European 0,175,974 and 0,145,185. Most of them are constructed for cutting the guide tubes from the inside, so that the operation is not hindered by the bundle of fuel rods of the assembly. Since any damage to a rod would cause contamination, these apparatus should be designed for avoiding any cut into the sheaths of fuel rods adjacent the tube to be cut. This condition is easily fulfilled when the guide tubes are cut immediately below the end-piece. It is much more of a problem when it is desired to cut the tube at a distance below the upper end of the rods, so that these latter may be subsequently picked up readily with a gripping tool.

SUMMARY OF THE INVENTION

It is an object of the invention to provide an improved apparatus for separating an end-piece from the guide tubes of a fuel assembly. It is a more specific object to provide an apparatus able to accurately sever a plurality of (and preferably all) the guide tubes, and possibly the instrumentation tube, of the assembly simultaneously, with a volume of waste as small as possible and to remove the detached end-piece, without use of an additional tool.

To this end, the invention provides an apparatus for separating an end-piece of a nuclear fuel assembly, said end-piece having an adapter plate formed with passages for guide tubes fixed to the adapter plate and to another end-piece; the apparatus comprises a plurality of cutting tools insertable into the guide tubes and a mount having, on the one hand, means for removable fixing and centering on the end-piece and, on the other hand, means for guiding and maintaining the tools in a fixed and defined distribution, corresponding to that of the guide tubes, wherein said tools each include a hollow shaft whose end part is divided by longitudinal slits into expandable fingers with a cutting edge and a rod movable axially along the shaft cooperating therewith for opening the fingers radially outwardly and retracting them, wherein the shafts are mounted for rotation on a plate which is vertically movable with respect to the mount by first drive means and having a motor for simultaneously rotating all shafts; the rods are carried by an expansion unit movably vertically with respect to the plate by second drive means.

Each of the stems advantageously has an end-piece which causes the forced radial retraction of the fingers when the stems are brought into a top position with respect to the shaft and a cone for forced opening out of the fingers when the stem is lowered with respect to the shaft from said top position. The mount advantageously includes, in addition to means for fixing to the end-piece, ejector levers which abut the detached end-piece and drive it downwards out of the centering means.

There is also provided a method for separating an end-piece of a fuel assembly of the above-defined kind, including the steps of:

temporarily fixing a frame on the end-piece to be removed, in alignment therewith, moving all shafts of a set of shaft simultaneously, with respect to the frame, in a direction causing insertion of the shafts into the guide tubes over a depth such that end parts of the shafts, expandable and carrying cutting elements, face the location where cutting should take place, rotating the set of shafts simultaneously, and progressively spreading the end parts by simultaneous insertion of the stems into the set of shafts.

The invention will be better understood from the following description of a particular embodiment and modifications, given by way of examples only. The description refers to the accompanying drawings.

DETAILED DESCRIPTION OF PREFERRED EMBODIMENTS

Figure 1:
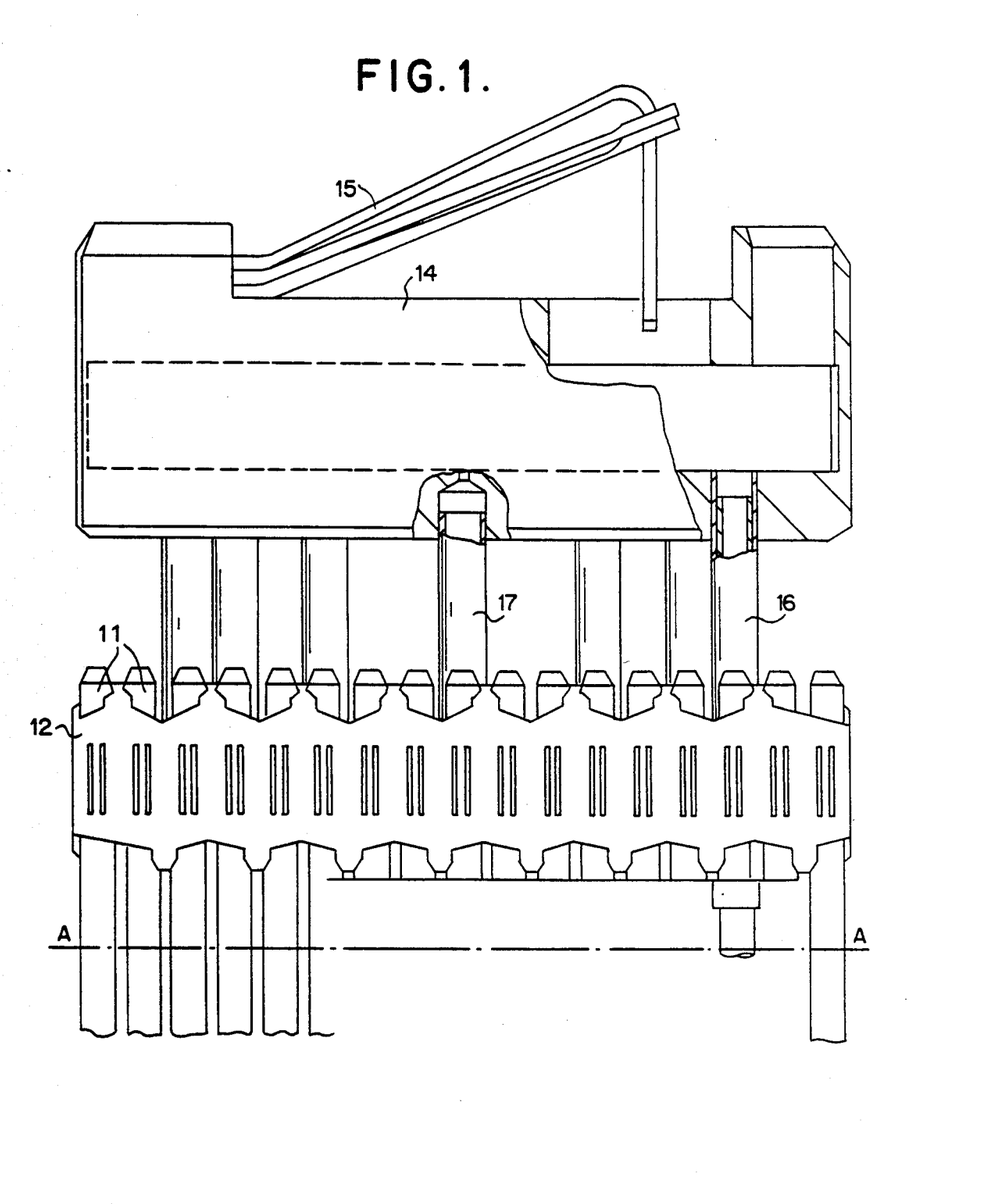
FIG. 1 shows schematically, in elevation and in partial section, the top part of a nuclear fuel assembly.

The apparatus which will be described by way of example is for cutting the guide tubes and the central instrumentation tube of a fuel assembly of the kind shown in FIG. 1, just below the top grid 12, for instance at the level shown by line AA. The fuel assembly comprises an upper end-piece 14 provided with hold-down springs 15 and connected to the lower end-piece (not shown) by guide tubes 16 and a central instrumentation tube 17. The end-pieces, tubes 16–17 and grids spaced apart along the guide tubes form a skeleton of the fuel assembly, which holds the fuel rods 11 in position. Assemblies frequently used at the present time have twenty-five guide tubes 16 which it is desirable to cut at about 2 cm under the uppermost grid 12, the only one shown in FIG. 1, so that the top ends of rods 11 are clear once the upper end-piece has been removed.

Figure 2:
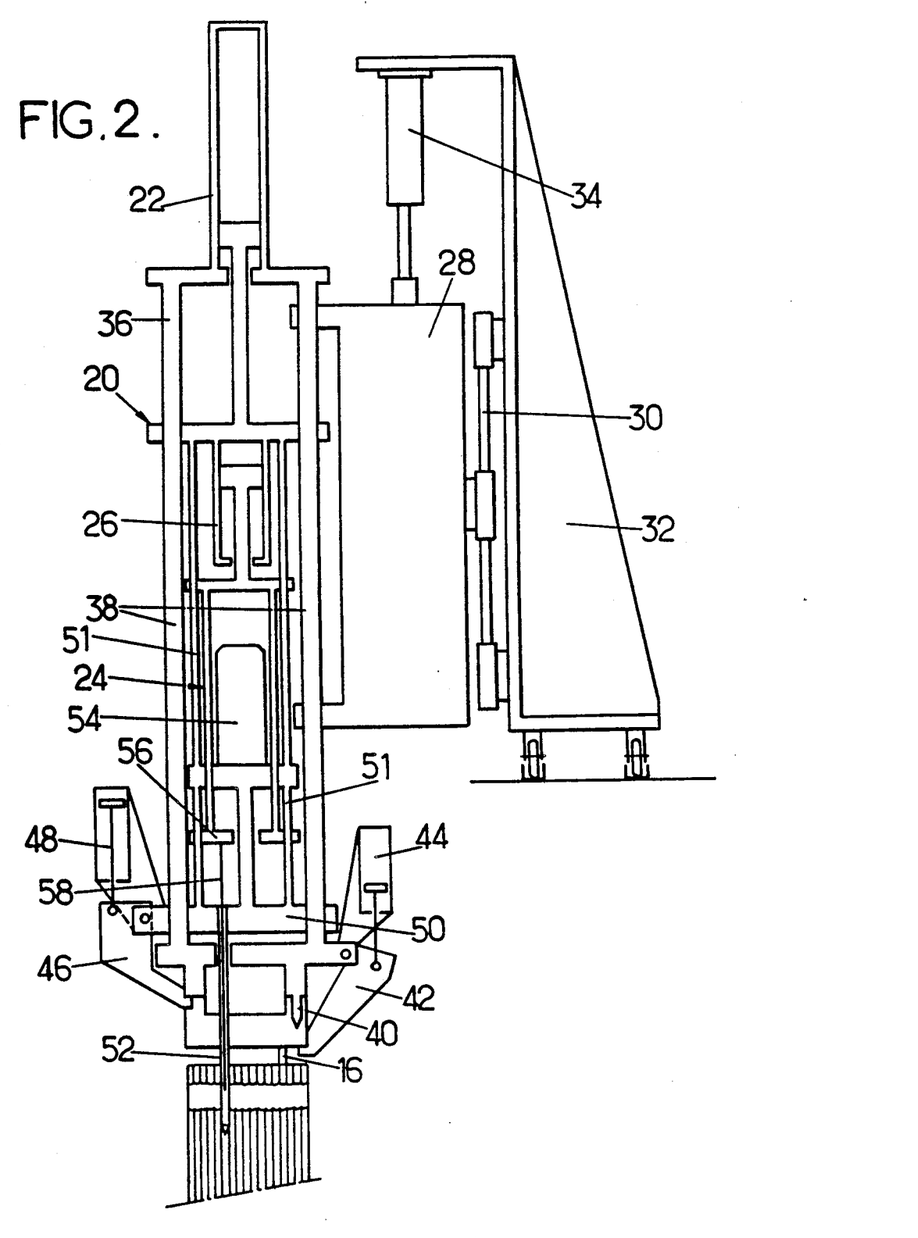
FIG. 2 is a simplified diagram showing the general construction of an apparatus of the invention, in elevation.

The end-piece removal apparatus shown schematically in FIG. 2 may be regarded as including a mount, a cutting unit 20 movable vertically with respect to the mount by first drive means, typically a hydraulic jack 22, and an expansion unit 24 movable vertically with respect to the cutting unit by second drive means such as a hydraulic jack 26.

The mount shown in FIG. 2 includes a support 28 mounted on vertical slides 30 of a horizontally movable carriage 32. A jack 34 is provided on the carriage for adjusting the height of support 28. A frame 36 is fixed on the support, carries the cylinder of jack 22 and has vertical columns 38 for vertically guiding and indexing the cutting unit 20. A lower plate of the frame 36 is provided with positioning pins 40 slidably fitting into corresponding holes in the upper end-piece. Hooks 42, four in number for example, are pivotally connected to the lower plate and actuatable by jacks 44 for applying the plate of frame 36 against the end-piece. Ejector levers 46 actuatable by jacks 48 drive the end-piece downwards so as to separate it from the apparatus, as will be seen further on.

Figure 3:
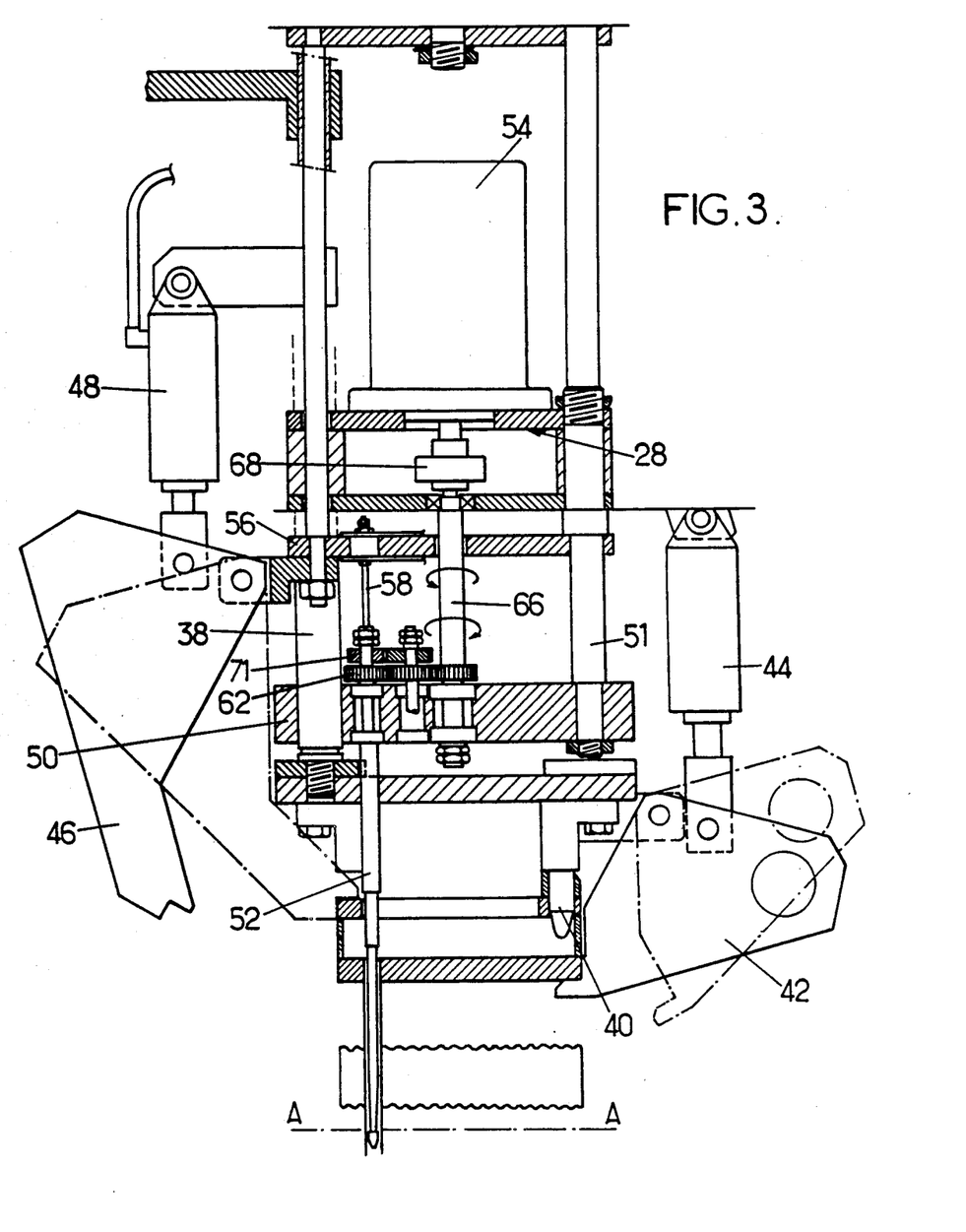
FIG. 3 is a view, in elevation and partial section, illustrating the fitting of one of the cutting tools of the apparatus of FIG. 2.

Referring to FIGS. 2 and 3, the cutting unit 20 is suspended from the piston of jack 22. It comprises an upper plate connected to the piston and a table 50 connected to the plate by columns 51. A plurality of mutually parallel hollow shafts or sleeves 52, only one of which is shown in FIG. 2, are rotatably connected to table 50 and project downwards through guide holes formed in the lower plate of frame 36. A common electric motor 54 is coupled to the shafts by movement transmission means for causing them to rotate simultaneously upon energization of the motor. The distribution of the shafts corresponds to that of the guide tubes and possibly of the instrumentation tube of the assembly whose end-piece is to be removed. The cutting unit 20 is slidably received on columns 38 for upward and downward movements controlled by jack 22.

As will be seen later, the lower part of each shaft is radially expandable from a retracted position, in which the cutting elements which it carries are out of contact with the wall of the corresponding guide tube (for insertion of the shafts into the tubes and removal therefrom) and a spread apart position in which the cutting elements furrow a groove in the walls of the guide tubes upon rotation of the shaft.

The expansion unit 24, for spreading out and retracting the lower parts of all shafts at the same time, is suspended from the piston of jack 26 whose cylinder belongs to the outting unit. The expansion unit includes an upper plate and a lower plate slidably received on the vertical columns 51 belonging to the cutting unit 20. From the lower plate 56 of the cutting unit are suspended a plurality of stems 58, in number equal to that of the shafts, having the same distribution as the shafts. The end part of each stem forms a pusher for forced expansion and retraction of the lower part of a respective shaft.

Figure 4:
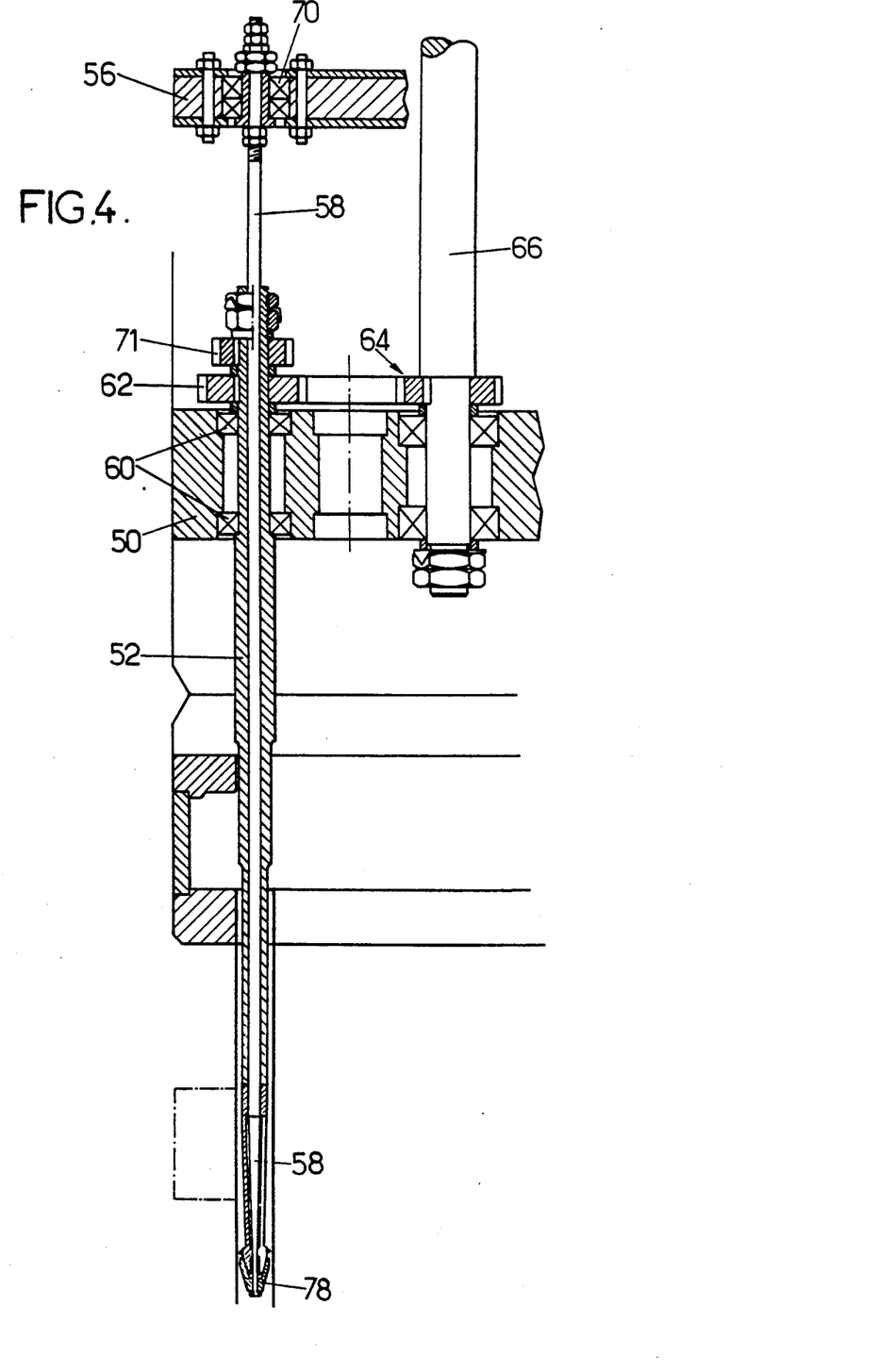
FIG. 4 is a detail view showing, on an enlarged scale, the cutting tool of FIG. 3 and its connection with the rotational drive motor of the apparatus.

FIGS. 3 and 4 show a possible construction of a shaft 52 and of the elements which are associated therewith. Each shaft 52 is rotatably received in bearings 60 mounted in table 50. A pinion 62 secured to the shaft is coupled, by a gear train 64, to the central shaft 66 which is connected to the rotary output shaft of motor 54 by a coupling 68. The motor 54 delivers the cutting power required for all shafts 52 at the same time. Some of the shafts do not receive power directly from the motor, but via another shaft, through additional gears such as that shown at 71 in FIG. 4.

Figure 5:
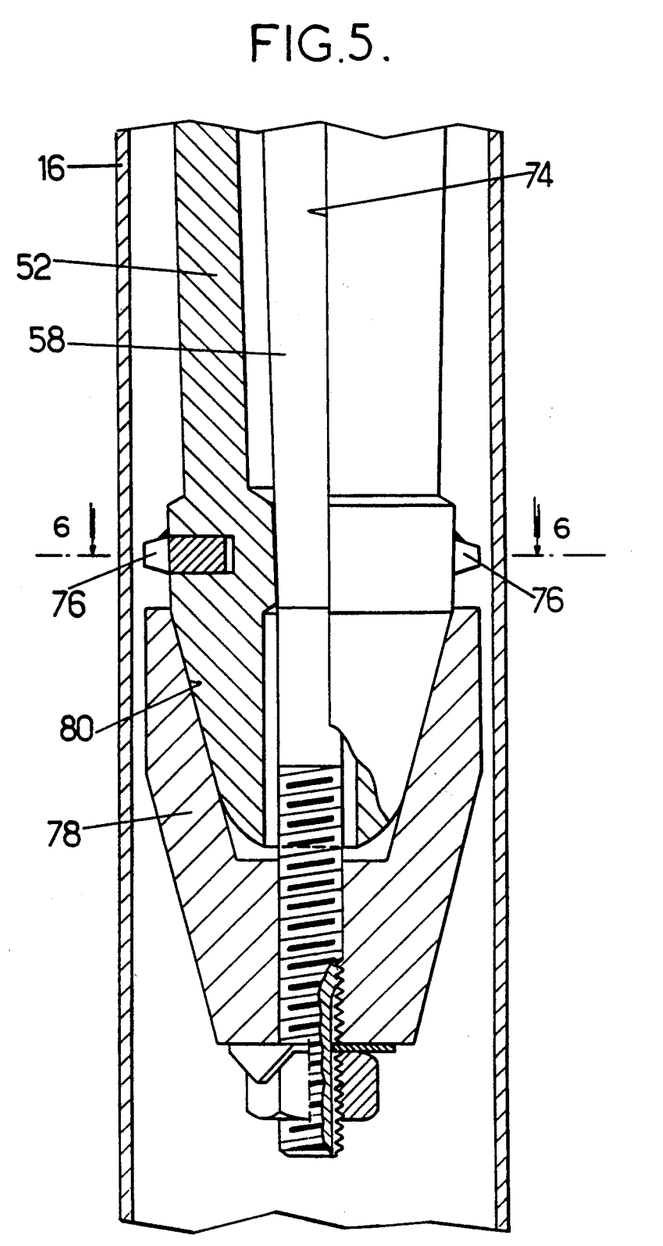
FIG. 5 is an enlarged detail view showing the lower end part of the cutting tool of FIG. 4.
Figure 6:
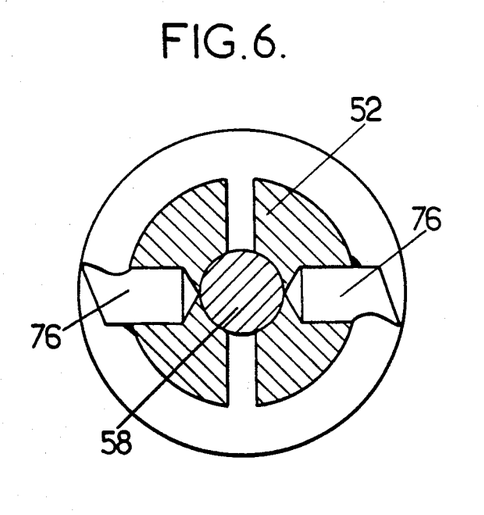
FIG. 6 is a cross-section through line VI—VI of FIG. 5.
Figure 7:
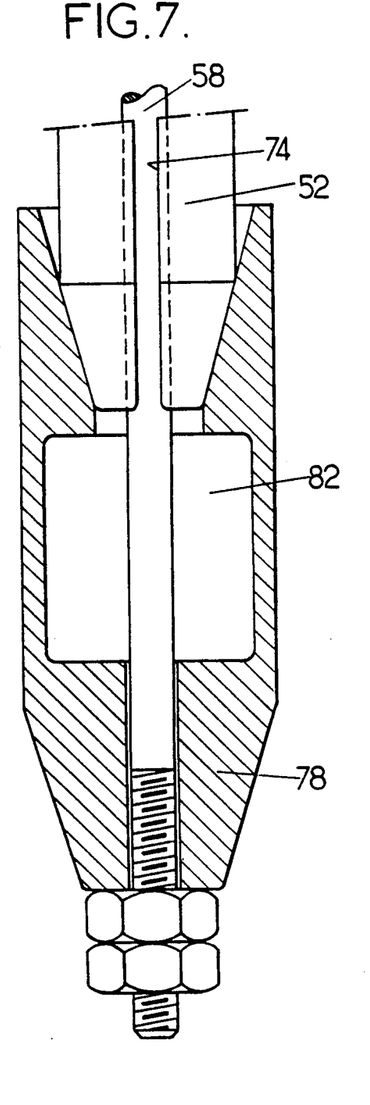
FIG. 7, similar to FIG. 5, shows a modified embodiment.

The lower parts of all shafts are identical and may be as shown in FIGS. 5 to 7. A diametral slit 74 in the lower part (FIG. 6) defines two gripping arms which each have a cutting element such as a cutter 76. A central passage formed in each shaft has a restricted section at the same horizontal level as the cutters 76.

Each stem 58 has a section of frusto-conical shape which flares upwardly. When the piston of jack 26 is in its upper position, the stems 58 are in the position shown in FIG. 5 and the frusto-conical section leaves room for allowing fingers to retract radially to a position where the radial space occupied by cutters 76 is less than the cross-section of the guide tube to be cut. A generally conical end-piece is fixed to the end of rod 58 for example by a threaded connection and a nut. The conical internal wall of the end-piece 78 is arranged to cooperate with an end cone 80 of shaft 52. When the piston of jack 26 is in its upper position, the conical end-piece forces the fingers of the gripper to retract radially, as shown in FIG. 5. On the other hand, when the piston of jack 26 is in its lower position, the end-piece 78 is clear from the gripping arms and the arms are spread apart by the frusto-conical part of the stem.

The device which has just been described operates as follows.

The apparatus is brought above a fuel assembly to be dismantled by carriage 32. Frame 36 is lowered onto the assembly by moving the vertical support 28 downwardly over guides 30 fixed to carriage 32, with jack 34, so as to engage the centering pins 40 into the upper end-piece. Jacks 44 are actuated to lock the end-piece against the plate of frame 36, while the ejectors are in the position shown in FIG. 2. The pistons of jacks 22 and 26 are in their uppermost positions.

Jack 22 is then actuated to lower the cutting unit 20. All shafts 52, whose gripping arms are retracted, move into and along the guide tubes until the cutters 76 are at the required level, which typically corresponds to the lower end of the travel path of the piston of jack 22.

Motor 54 is then energized and drives all shafts 52 simultaneously; then the jack 26 is energized. The expansion unit 24 moves down, over a distance which may for example be about 50 mm. The frusto-conical endpieces 78 release the gripping arms and the frusto-conical sections of stems 58 force the gripping arms progressively radially outwards so as to advance the cutters 76 radially and to cut the guide tubes. The accuracy of movement provided by a frusto-conical pusher guarantees that none of the cutters 76 projects out of the guide tubes by such an extent that it would damage adjacent fuels rods.

Once the cutting is complete, stems 58 are moved upwardly by actuating jack 26 for raising the piston thereof. The conical pusher of each stem releases the corresponding gripping arms which are forcibly retracted by the conical end-piece 78.

In the modification shown in FIG. 7, in which the elements corresponding to those of FIG. 5 are designated by the same reference numbers, a chamber 82 for receiving the debris resulting from cutting is formed in each conical end-piece 78.

Figure 8:
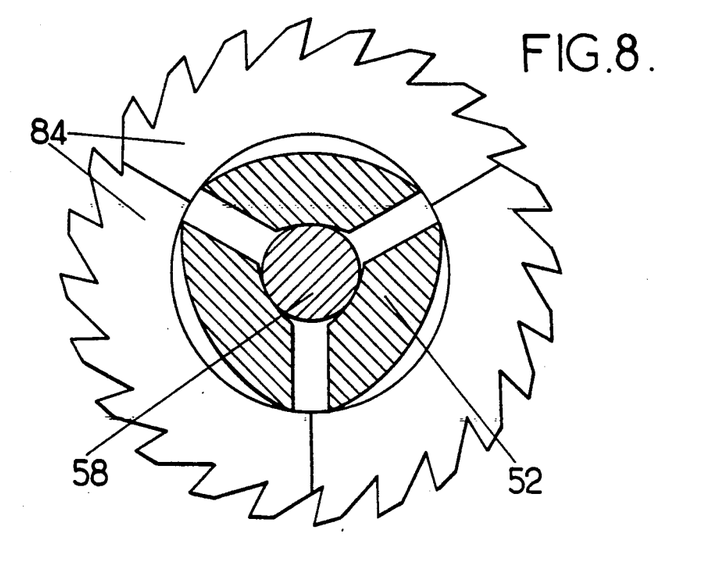
FIGS. 8 and 9, similar to FIG. 6, show a modified construction of a shaft of the apparatus, respectively in retracted and opened out positions.
Figure 9:
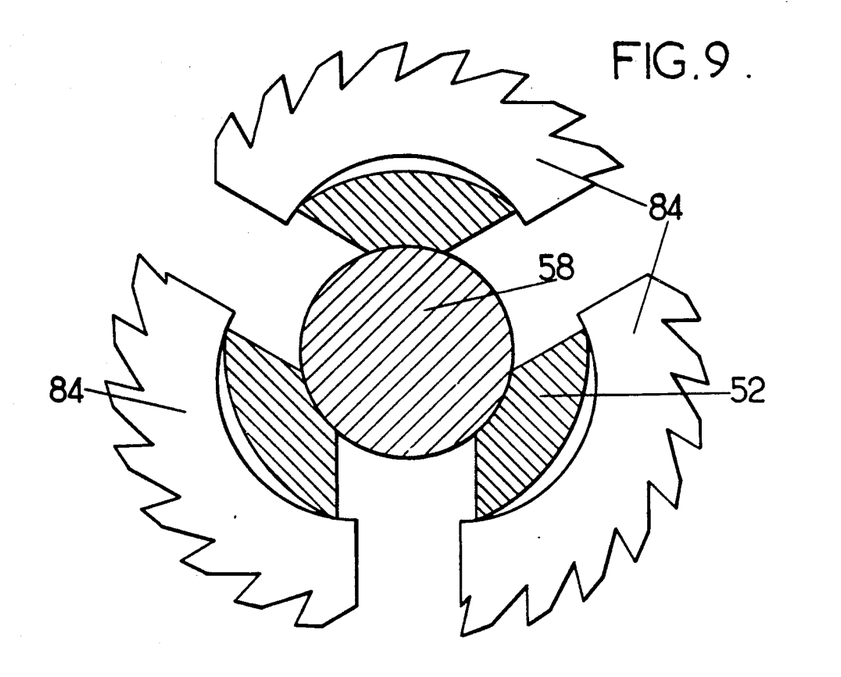

The cutting elements are not necessarily cutters of the kind shown in FIGS. 5 and 6. Referring to FIGS. 8 and 9, in a modified embodiment the lower end part of each shaft 52 is separated by slits into three fingers each with an angular development of 120°, and each carrying a toothed sector 84. FIG. 8 shows the sectors in the retracted position, in contact with each other. FIG. 9 shows the sectors when forcibly spread apart by the conical pusher of stem 58 for cutting the guide tubes.

We claim:

1. Apparatus for separating an end-piece of a nuclear fuel assembly from a plurality of mutually parallel guide tubes, said end-piece having an adapter plate formed with passages for receiving said guide tubes which are fixed to the plate, comprising:

a plurality of mutually parallel cutting tools insertable into respective ones of the guide tubes and each having a hollow shaft whose end part is divided by longitudinal slits into expandable fingers each provided with a cutting edge and a stem movable axially along the pin and cooperating therewith for spreading out and retracting the fingers radially;

a mount having connecting means for removably fixing and centering said mount on the end-piece and having guiding means for guiding and maintaining a fixed and predetermined distribution of said shaft, corresponding to a distribution of the guide tubes; a plate vertically movable with respect to the mount by first drive means and carrying motor means for simultaneously rotating all said shafts which are rotatably connected to said plate; and an expansion unit movable vertically with respect to the plate by second drive means and operatively associated with said stems for simultaneously moving all said stems axially.

2. Apparatus according to claim 1, wherein each of the stems has a generally conical end-piece for causing forced radial retraction of the fingers when the stems are brought into an upper position with respect to the respective shaft and a conical portion for forced opening out of the fingers when the stem is lowered with respect to the shaft from said upper position.

3. Apparatus according to claim 1 or 2, wherein said mount includes ejector levers arranged to bear on the end-piece and to force it downwards out of the centering means.

4. Apparatus according to claim 1, wherein said table belongs to a cutting unit having guide means slidably received on the mount and the motor means are coupled by gear trains to all said shafts which are suspended from a piston of a jack forming said first drive means.

5. Apparatus according to claim 4, wherein said expansion unit has guide means cooperating with the cutting unit and is suspended from a piston of a jack forming said second drive means and whose cylinder belongs to the cutting unit.

6. Apparatus according to claim 5, wherein said expansion unit comprises a plate and all said stems are rotatably non-slidably connected to said plate by bearings.

7. Apparatus according to claim 1, wherein the end part of each shaft is formed with slits splitting said end part into two fingers each carrying a cutter.

8. Apparatus according to claim 1, wherein the end part of each shaft is split by slits into a plurality of fingers each carrying a toothed cutting sector.

* * * * *